United States Patent Office 2,996,548
Patented Aug. 15, 1961

2,996,548
PRODUCTION OF HEXACHLOROCYCLO-
PENTENONES
Edward D. Weil, Niagara Falls, N.Y., assignor to Hooker
Chemical Corporation, Niagara Falls, N.Y., a corpo-
ration of New York
No Drawing. Filed Mar. 3, 1958, Ser. No. 718,471
6 Claims. (Cl. 260—586)

The present invention relates to the production of halogenated cyclic ketones. More specifically the present invention relates to a process for producing hexachlorcyclopentenones by treatment of hexachlorocyclopentadiene and/or octachlorocyclopentene with gaseous molecular oxygen.

It is an object of the present invention to provide a simple, economical and efficient process for the preparation of the following compounds:

I 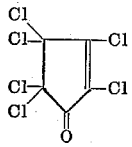

II 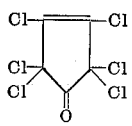

The compound of Structure I has the chemical name 2,3,4,4,5,5-hexachloro-2-cyclopentenone, and the compound of Structure II has the chemical name 2,2,3,4,5,5-hexachloro-3-cyclopentenone.

In accordance with the process of this invention, it has been found that by passing molecular oxygen through hexachlorocyclopentadiene and/or octachlorocyclopentene at elevated temperatures, high yields of the above products are obtained. Since the reaction is dependent in part upon contact with the gaseous oxygen, it is recommended that the oxygen be introduced in such a way as to maintain the oxygen in a highly divided state so as to increase the interfacial area of contact. Generally, the oxygen may be introduced into the reaction mixture by a bubbling technique using a pipe orifice placed below the surface of the liquid. Sintered glass or porous clay may be used and are preferred means to disseminate the oxygen throughout the liquid reaction mixture. Rapid stirring during the reaction is also useful in the dispersion of the gaseous reactant. Other techniques, such as the use of tall towers containing the reaction mixture, may also be used to gain a prolonged interfacial contact between the gas bubbles and the reaction mixture, thus utilizing the oxygen to its greatest advantage. The use of continuous reactors whereby the oxygen is forced countercurrently through a continuously moving stream of the reaction mixture is also advantageous.

It has also been found that catalysts may be employed in the process of the present invention in order to minimize side reactions and increase the reaction rate and degree of completion. Consequently, the use of catalysts is preferred, although they are not necessary. Illustrative but not limitative of catalysts which can be used are ultraviolet light, a small amount of chlorine gas mixed into the oxygen gas, activated charcoal, peroxides and partially oxidized material from a prior oxidation run. For example, by exposing the reaction mixture to actinic radiation, e.g., the light from a mercury vapor lamp, especially during the early stages of the reaction, side reactions can be minimized and the reaction rate and degree of completion can be appreciably increased. In order to overcome the induction period, which frequently occurs, it is desirable to use well purified hexachlorocyclopentadiene and/or octachlorocyclopentene since inhibitory impurities may exist in the unpurified chemicals. Purification can be accomplished by fractionation, or in the case of octachlorocyclopentene, chlorination and recrystallization. Other methods such as absorption in treatment with various reagents may be used.

In order that those skilled in the art may have sufficiently detailed instructions in practicing the process of the present invention, the following examples will illustrate typical procedures. This detailed disclosure is not to be construed as limiting the scope of the present invention as further indicated elsewhere herein.

Example 1

A three-necked, round-bottomed flask was equipped with a thermometer, sparger, and stirrer and was connected to a Dry Ice trap. One hundred milliliters of hexachlorocyclopentadiene was placed in the flask and gaseous oxygen bubbled in below the surface of the liquid at such a rate as to cause the mixture to reflux at between about one hundred and seventy and about one hundred and seventy-eight degrees centigrade. In three hours the refractive index changed from $n_D^{21.5}$ 1.5634 to $n_D^{21.5}$ 1.5684. By infra red spectroscopy the mixture was shown to contain about six percent of the 2,2,3,4,5,5-hexachloro-3-cyclopentenone isomer and about three percent of the 2,3,4,4,5,5-hexachloro-2-cyclopentenone isomer. The remaining material was essentially unreacted hexachlorocyclopentadiene. The product can be recovered by fractional distillation and the unreacted hexachlorocyclopentadiene recycled.

Example 2

A three-necked, round-bottomed flask was equipped with a thermometer, sparger and stirrer and was connected to a Dry Ice trap. Two hundred and eighty milliliters of hexachlorocyclopentadiene was introduced into the flask. Two two hundred and fifty watt mercury vapor lamps were placed so as to obtain high light intensity on both the liquid and vapor zones of the reflux apparatus. Gaseous oxygen was bubbled in below the surface of the liquid at such a rate as to cause the mixture to reflux at between about one hundred and sixty and one hundred and eighty degrees centigrade. The reaction was continued for a period of about twenty hours. Ninety-eight percent of the product was fractionally distilled at between one hundred and eleven degrees centigrade and one hundred and twenty-two degrees centigrade at fifteen millimeters of mercury, and infra red spectroscopy of this fraction showed about sixty percent unreacted hexachlorocyclopentadiene, about twenty-five percent of the 2,2,3,4,5,5-hexachloro-3-cyclopentenone isomer and about fifteen percent of the 2,3,4,4,5,5-hexachloro-2-cyclopentenone isomer. The remaining material gave an analysis of about ninety-one percent of the 2,2,3,4,5,5-hexachloro3-cyclopentenone isomer and no bands for the other isomer. The products were further identified by melting point determinations—the melting points taken corresponding to the melting points cited in the literature; namely ninety-two degrees centigrade for the 2,2,3,4,5,5-hexachloro-3-cyclopentenone isomer and twenty-eight degrees for the 2,3,4,4,5,5-hexachloro-2-cyclopentenone isomer.

Example 3

A three-necked, round-bottomed flask was equipped with a thermometer, sparger and stirrer and was connected to a Dry Ice trap. One hundred and sixty milliliters of octachlorocyclopentene was introduced into the flask. Two two hundred and fifty watt mercury vapor lamps were placed so as to obtain high light intensity on both the liquid and vapor zones of the reflux apparatus. Gaseous oxygen was bubbled in below the surface of the liquid at such a rate as to cause the mixture to reflux at about two hundred degrees centigrade. The reaction was continued for a period of about twenty hours. By infrared spectroscopy, it was shown that about a thirty percent conversion was obtained with approximate yields of thirty-five percent 2,2,3,4,5,5-hexachloro-3-cyclopentenone and twenty-five percent 2,3,4,4,5,5-hexachloro-2-cyclopentenone.

The oxygen utilized in the present process is preferably substantially pure gaseous oxygen such as is available commercially in pressurized cylinders, but air containing oxygen diluted with relatively inert gases may also be utilized. Since the molecular oxygen is the active component in the present process, a greater rate of reaction is obtained by the use of relatively pure oxygen than by the use of the less preferred air which contains oxygen diluted with inert gases, notably nitrogen. However, both are suitable in the present process to produce comparable products.

The process of the present invention is carried out by contacting oxygen with the reactant mixture while heating the hexachlorocyclopentadiene at a temperature between about forty and three hundred degrees centigrade, and a preferred temperature is between about one hundred to two hundred degrees centigrade. The time of reaction may vary and generally it does vary with the temperature and pressure.

It is preferred to maintain saturation of the reaction mixture with gaseous oxygen. By using superatmospheric pressures, the reaction time can be lessened, the reaction temperature maintained in the desired range where no discoloration or side products are produced, and the reaction can be made to go further toward completion. Thus, the use of higher pressures up to about two hundred pounds per square inch is desirable although not essential to the present process.

In addition, the rate of oxygen influx has an effect on the time required to produce a reasonable yield of the product, and at high rates of oxygen influx shorter times are ordinarily required. Further, the degree of foaming or size of bubbles, contact time and the like, all have an influence on the rate of reaction and should be taken into consideration in the determination of the desirable reaction time. Generally, the time of reaction may vary from several hours to several days. Prolonged reaction times lead ultimately to a reduction in yield of the cyclopentenone products, due to a self-condensation reaction of the latter to higher molecular weight ketones.

The rate of oxygen influx may vary, but generally it has been found that rates of from about two hundred to about fifteen hundred cc. per minute per mole of the reactant mixture are satisfactory, although greater or lesser rates of influx can be maintained. If a greater rate of oxygen gas influx is maintained, a shorter period of time is necessary to obtain a satisfactory yield of ketone, while a lower rate of influx will require a correspondingly longer time.

While a preferred procedure in the process of the present invention is to react hexachlorocyclopentadiene and/or octachlorocyclopentene was gaseous oxygen in the absence of solvent, thus eliminating the necessity of later separations, the use of solvents is not detrimental to the present process. Such solvents should preferably be inert to gaseous oxygen and to the organic acid chlorides which are produced by this process.

The compounds prepared by the process of the present invention have utility as fungicides and insecticides. This activity is useful in many agricultural applications common to commercial pesticides and may also be used in the protection of industrial products from attack by fungus, rot and mildew. In addition to this the compounds produced by the process of the present invention have utility as chemical intermediates which are highly chlorinated, contain a reactive double bond, are cyclic in character and contain a reactive ketone group.

This invention may be embodied in other forms or carried out in other ways without departing from the spirit or essential characteristics thereof. The present embodiment of the invention is therefore, to be considered as in all respects, illustrative and not restrictive, the scope of the invention being indicated by the appended claims and all changes which come within the meaning and range of equivalency of the claims are intended to be embraced therein.

I claim:

1. A process for preparing hexachlorocyclopentenones which comprises passing gaseous oxygen through a material selected from the group consisting of hexachlorocyclopentadiene, octachlorocyclopentene and mixtures thereof at a temperature between about forty and three hundred degrees centigrade.

2. The process of claim 1 wherein the material oxygenated is hexachlorocyclopentadiene.

3. The process of claim 1 wherein the material oxygenated is octachlorocyclopentene.

4. The process of claim 2 wherein 2,3,4,4,5,5-hexachloro-2-cyclopentenone is recovered as product of the process by distillation of the crude oxidized mixture.

5. The process of claim 2 wherein 2,2,3,4,5,5-hexachloro-3-cyclopentenone is recovered as product of the process by distillation of the crude oxidized mixture.

6. The process of claim 1 wherein the temperature is maintained between about one hundred and about two hundred degrees centigrade.

References Cited in the file of this patent

UNITED STATES PATENTS 2,795,608     Molotsky et al.     June 11, 1957